United States Patent Office 3,267,670
Patented August 23, 1966

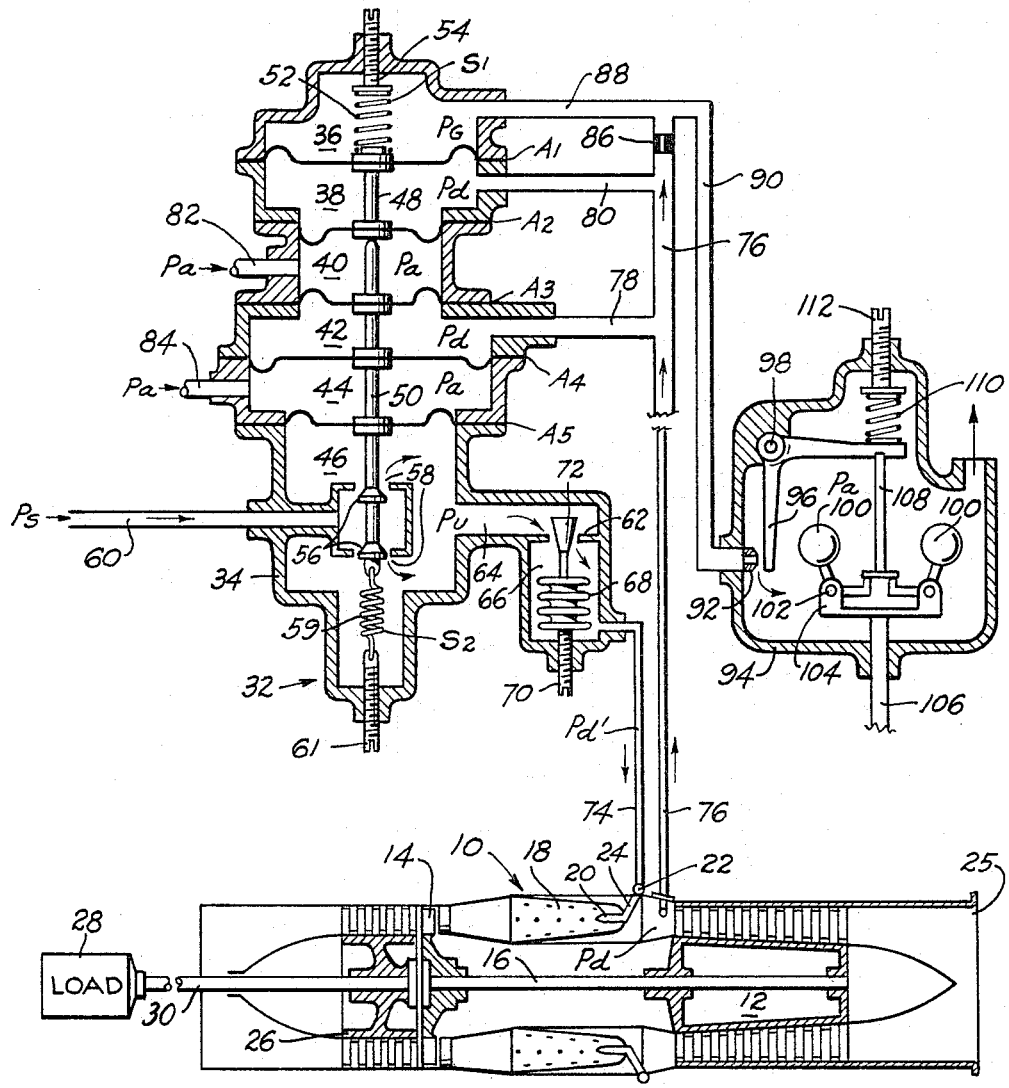

3,267,670
GAS TURBINE ENGINE CONTROL
Howard L. McCombs, Jr., South Bend, Ind., assignor to The Bendix Corporation, South Bend, Ind., a corporation of Delaware
Filed Dec. 13, 1963, Ser. No. 330,466
7 Claims. (Cl. 60—39.28)

The present invention relates to a gas turbine engine control and in particular a control for use with a gas turbine engine wherein the fuel is a compressible gaseous fluid such as natural gas or the like.

It is an object of the present invention to provide a fuel control which provides acceleration limiting, speed governing, and deceleration without flame-out for a gas turbine engine fired with a compressible gaseous fuel.

It is another object of the present invention to provide a control of the above described type of simple and reliable design utilizing to a high degree pneumatic sensing and computing components.

Other objects and advantages of the present invention will become apparent from the specification and the accompanying drawing wherein:

Referring to the drawing there is schematically shown a preferred embodiment of my control and a suitable gas turbine engine to show both the specific control details and engine connections.

The gas turbine engine is generally indicated by numeral 10 and it includes a compressor 12, a first turbine 14 and a drive shaft 16 connected between said compressor and said first turbine. A plurality of combustion chambers 18 are provided, with each combustion chamber including a fuel jet 20 which is supplied fuel from a common conduit 22 through individual fuel lines 24. The foregoing engine elements comprise in general a power producing section of the engine whereby air is received at an inlet 25, pressurized by compressor 12, mixed with fuel and burned in combustion chamber 18 to produce high energy content gases. A portion of the generated energy is absorbed by first turbine 14 sufficient to drive compressor 12. Gases expelled by turbine 14 pass into a power absorbing section of the engine which includes a second or power absorbing turbine 26 which is adapted to drive any rotationally driven load 28 through drive shaft 30.

In an engine of the type described it is often desirable to burn a compressible fuel such as natural gas or the like because of its availability and/or cost in comparison with conventional liquid fuels. Because of its compressible nature natural gas poses special problems of control, requiring different control concepts from that used for liquid fuel. For example, the metering problem is more complex since as the absolute pressure level of gas is increased it will have a greater density and thus more B.t.u.'s for a given volume. Whereas liquid fuel being incompressible, a known volume will have a known energy content regardless of the absolute pressure of the liquid. Further, special friction, seal, and leakage problems exist which require special treatment.

There is shown a regulator control generally indicated by numeral 32 comprised of a housing 34 divided into six chambers 36, 38, 40, 42, 44 and 46 by five diaphragms $A_1$, $A_2$, $A_3$, $A_4$ and $A_5$ respectively (the diaphragm symbol designating both the specific diaphragm and its area). Each diaphragm is peripherally secured to housing 34. Diaphragms $A_1$ and $A_2$ are connected at their center by rod 48 while diaphragms $A_3$, $A_4$ and $A_5$ are similarly connected by the common rod 50. A compression spring 52 generating a force $S_1$ is disposed in chamber 36 abutting the upper end of rod 48 on one end and an adjustable spring retainer 54 on the other. A balanced double regulator valve 56 is formed on the lower end of rod 50 and is operative with the double valve seats or orifices 58 to control the flow of compressible fuel supplied by inlet passage 60. The pressure of the supply gaseous fuel upstream of regulator valve is designated $P_s$. Rod 50 is urged in a downwardly direction by tension spring 59 having a force $S_2$ which is hooked to the lower end of rod 50 and to adjustable stem 61, threadedly mounted in housing 34.

A metering restriction 62 is formed by the housing 34 and connected to the chamber 46 by passage 64. A chamber 66 is formed downstream of restriction 62 and contains a bellows member 68 which is charged with a thermal sensitive liquid so as to be temperature responsive. The lower end of bellows 68 is adjustably connected to housing 34 by the threaded stem 70 which extends through the housing so as to be externally adjustable. A temperature correction valve 72 is connected to the upper or movable end of bellows 68 and is disposed within the metering restriction 62 to correct the effective area thereof with variations in the gas fuel temperature. Pressure of the gaseous fuel upstream of metering restriction 62 (in chamber 46 and conduit 64) is designated $P_u$. Fuel outlet passage 74 is connected between chamber 66 and conduit 22 of the engine 10 to deliver fuel from control to engine.

Air pressure at the discharge side of compressor 12 of engine 10, designated $P_d$, is received by an open end of conduit 76 and from thence transmitted to branch passages 78 and 80 to chambers 42 and 38 respectively within the regulator control. Chambers 40 and 44 are vented to atmospheric pressure, $P_a$, by vent conduits 82 and 84, respectively. Compressor discharge pressure from conduit 76 is transmitted through the fixed restriction or bleed member 86 and branch passage 88 to chamber 36 where it is designated $P_G$ to indicate that it is governor controlled. A second, branch passage 90 is connected to passage 76 downstream of restriction 86 and terminates at its other end with servo control orifice 92 within governor housing 94. Orifice 92 is controlled to exhaust varying quantities of air by the lower end of movable lever 96 pivotably mounted at 98 to the govenor housing. Lever 96 has an arm extending to the right of its pivot which receives on opposite sides a speed force and a setting force and thus is positionable in response to the difference or error therebetween. The speed force is obtained from a pair of flyweights 100 pivotably mounted at 102 to a rotatable table 104 which is integrally formed with shaft 106 extending exteriorly of the governor housing. Shaft 106 is adapted to be geared or otherwise connected to either shaft 16 or 30 of engine 10 depending on whether it is desired to regulate the speed of turbine 14 and its associated compressor or turbine 26 and its connected load. The speed force from flyweights 100 is transmitted by rod 108 to lever 96 tending to rotate the lever counterclockwise in a direction opening servo orifice 12. A setting force is applied in opposition to the speed force by spring 110 which abuts lever 96 on one end and is retained by adjustable retainer 112 on the other. Adjustment of retainer 112 serves to change the setting force applied to lever 96 and thus will change the regulated engine speed.

*Operation*

Control operation is accomplished by regulating the pressure ratio $P_u/P_d$ to desired values to accomplish acceleration limiting, governing and deceleration of the engine.

Just prior to an engine acceleration governor 94 is at an underspeed condition and the force of flyweights 100 are less than the setting force from spring 110 so that servo orifice 92 is closed. When the servo orifice is closed there is no air flow through bleed 86 and consequently no pressure drop thereacross so that $P_G = P_d$ and diaphragm $A_1$ is balanced. It will also be noted that diaphragms $A_2$ and $A_3$ are of equal size and each has the same $P_d - P_a$ pressure differential impressed on opposed sides, but in opposite directions so that the diaphragms $A_2$ and $A_3$ are collectively balanced. The forces positioning valve 56 during an acceleration then are:

(Eq. 1) $\quad (P_d - P_a)A_4 + S_1 + S_2 = (P_u - P_a)A_5$ rearranging:

(Eq. 2) $\quad P_u = A_4/A_5 P_d + \dfrac{S_1}{A_5} + \dfrac{S_2}{A_5} - \dfrac{A_4}{A_5} P_a + P_a$ The quantity $A_4/A_5$ is a fixed diaphragm ratio and may be expressed as a constant $K_1$:

(Eq. 3) $\quad K_1 = A_4/A_5$

For ground installations $P_a$ may be considered substantially constant as may the spring forces $S_1$ and $S_2$ which vary only slightly during an acceleration. Therefore the constant $K_2$ may represent:

(Eq. 4) $\quad K_2 = \dfrac{S_1}{A_5} + \dfrac{S_2}{A_5} - \dfrac{A_4}{A_5} P_a + P_a$ Substituting Equations 2 and 4 in Equation 2 gives:

(Eq. 5) $\quad P_u = K_1 P_d + K_2$

From inspection of Equation 5 it will be observed that substantially a constant proportion or ratio of $P_u$ to $P_d$ exists during an acceleration with a proportionality constant of $K_1$. This relationship defines an upper or acceleration limit at all engine speeds.

During deceleration the flyweights 100 overcome the force of spring 110 opening servo orifice 96 to its maximum extent and reducing $P_G$ to a minimum value approaching $P_a$. This establishes a pressure differential on diaphragm $A_1$ sufficient to overcome spring 52 and the force $S_1$ causing rod 48 to move upwardly away from rod 50. The forces positioning valve 56 during a deceleration then become:

(Eq. 6)
$\quad (P_d - P_a)A_4 + S_2 = (P_u - P_a)A_5 + (P_d - P_a)A_3$ rearranging:

(Eq. 7) $\quad P_u = \dfrac{A_4 - A_3}{A_5} P_d + \dfrac{S_2}{A_5} - \dfrac{A_4 - A_3}{A_5} P_a + P_a$ The proportionality constant $K_3$ is:

(Eq. 8) $\quad K_3 = \dfrac{A_4 + A_3}{A_5}$ and let the constant $K_4$ equal:

(Eq. 9) $\quad K_4 = \dfrac{S_2}{A_5} - \dfrac{A_u - A_3}{A_5} P_a + P_a$

Substituting Equations 8 and 9 in Equation 7 gives:

(Eg. 10) $\quad P_u = K_3 P_d + K_4$

Equation 10 defines the deceleration relationship and it will be observed that this equation has the same form as the Equation 5 for accelerations. The principal difference being the values of the constants. By inspection it will be observed that the proportionality constant $K_3$ for decelerations is less than the proportionality constant $K_1$ for accelerations, compare Equations 3 and 8.

Thus it will be seen that my regulator operates to provide a high substantially constant $P_u/P_d$ ratio for accelerations and a second low substantially constant $P_u/P_d$ for deceleration, thus defining upper and lower fuel control limits. The relationship of constants $K_2$ and $K_4$ are less critical, particularly at high engine speeds where $P_d$ is high. However, for best design and to insure separation of the upper and lower fuel limits at low or idle speed, $K_4$ should be less than $K_2$ which is readily accomplished by designing the quantity $S_1$ to be greater than the quantity $A_3 P_a$.

Governing is accomplished by varying the $P_u/P_d$ ratio between the maximum acceleration limit and the minimum deceleration limit. The two extreme positions of governor lever 96 with respect to servo orifice 92 have been described above with respect to accelerations and decelerations. During accelerations, the governor is at an underspeed condition with servo orifice 92 closed and $P_G$ equals $P_d$. During decelerations the governor is overspeed with orifice 92 in its maximum open position and $P_G$ approaches $P_a$. When the engine is on-speed, the force of flyweights 100 balances that of spring 110 and lever 96 is in an intermediate controlling position and $P_G$ is intermediate $P_d$ and $P_a$. In this condition the force transmitted by rod 48 to rod 50 is less than during accelerations and $P_u/P_d$ ratio is less than the maximum limit but more than the minimum limit. Between the two limits the $P_u/P_d$ ratio will stabilize at the value required to maintain a steady controlled engine speed by virtue of the inverse speed vs. fuel pressure ratio relationship established by the governor. Should speed tend to exceed the value established by setting spring 110, lever 96 will move to a more open position reducing $P_G$ and thus reducing the downward force on rod 50 which is compensated by a closure of valve 56 and a reduction of $P_u$. Thus less fuel is supplied to the engine and engine speed falls to the value established by spring 110. Should speed fall below its set value, the reverse action will occur increasing $P_u$ and engine speed.

While the description has proceeded with reference to the ratio of $P_u/P_d$ it will be noted that $P_d$ is the back pressure on jet 20. For a natural gas or compressible fuel installation it is preferable that the jet 20 and incoming lines 24, 22 and 74 offer little appreciable restriction to flow since this will require a higher pressure supply pump. Accordingly, the gas pressure downstream of metering restriction 62 will closely approach $P_d$ and is designated $P_d'$. Even when the restriction of jet 20 and line 74 is significant, $P_d'$ will vary directly with $P_d$. Thus by regulating $P_u/P_d$ the pressure ratio $P_u/P_d'$ across metering restriction 62 has been similarly regulated to accomplish the metering function. In general, the effective area of metering restriction 62 is fixed, however, should the gas temperature change thus altering its heat content for a given gas volume, bellows 68 will sense the temperature change and position valve 72 so that the flow of fuel will be corrected.

Should it be desired to change the type of compressible gas fuel such as when the source of natural gas is changed or manufactured gas is used, adjustment of stem 70 may be made to correct for the change in heat content of the various gas types.

It should be further understood that other limiting devices such as overspeed, temperature, torque or power controllers or limiters may be readily added to the system if if desired by connecting them to line 90 and exhausting air therefrom when the limiting condition is reached. Commonly assigned U.S. Patent 3,040,529, issued June 26, 1962, in the name of James E. Hurtle contains teachings which show how to add a speed limiter to a common pneumatic line with a controlling governor which may be incorporated in the present invention. Commonly assigned patent application Serial No. 757,232, filed August 26, 1958, in the name of James E. Hurtle, and now abandoned may be referred to for a similar teaching with respect to an overtemperature limiter. Commonly assigned application Serial No. 92,617, filed March 1, 1961, now Patent No. 3,152,444, in the names of Joseph L. Peczkowski and Francis R. Rogers contains suitable teachings of torque and power controls added to a pneumatic pressure controlling governor. The description contained herein has illustrated my device in a simple form and it is readily apparent that modifications and additions suggested by these or other prior art teachings may be made without departing from the scope or spirit of the present invention.

Further it will be observed that my basic regulator device 32 is of inexpensive construction comprised primarily of a regulating valve and a series of controlling diaphragms which may be equivalent pressure responsive members such as bellows or the like. Diaphragms are, however, preferred due to low cost, absence of sliding friction forces, and significant deflection rates. The construction avoids the use of any sliding pressure seals which may cause friction or gas leakage and the various regulator and governor assemblies may be located remotely from one another at any convenient location on the engine.

I claim:

1. A fuel control for a gas fired gas turbine engine having an air compressor comprising: gas supply conduit means connected to said engine for supplying a pressurized gas fuel thereto, a metering restriction in said conduit means causing a gas fuel pressure drop, a regulator valve in said conduit movable to control said gas fuel pressure drop across said metering restriction, pressure responsive means responsive to gas pressure in said conduit means and a pressure generated by said engine compressor, said pressure responsive means being connected to said regulator valve to control a substantially constant ratio pressure drop across said metering restriction, engine speed responsive governor means connected to said pressure responsive means operative to control said compressor generated pressure acting thereon, said governor means operative when said engine is under speed to control said compressor discharge pressure to a first high pressure value causing said pressure responsive means to regulate a first high substantially constant ratio pressure drop across said metering restriction to define an upper fuel limit during engine accelerations, said governor means operative when said engine is over speed to control said compressor discharge pressure to a second lower pressure value causing said pressure responsive means to regulate a second lower substantially constant ratio pressure drop across said metering restriction to define a lower fuel limit during engine decelerations, said governor means further operative to control said compressor discharge pressure between said first high and second low pressure values during engine governing and thereby regulate the pressure ratio across said metering restriction to a value intermediate said upper and lower substantially constant limits.

2. A fuel control for a gas fired gas turbine engine having an air compressor comprising: gas supply conduit means connected to said engine for supplying a pressurized gas fuel thereto, a metering restriction in said conduit means causing a gas fuel pressure drop, a regulator valve in said conduit movable to control said gas fuel pressure drop across said metering restriction, first pressure responsive means responsive to gas pressure in said conduit means connected to said regulator valve to control a substantially constant ratio pressure drop across said metering restriction, second pressure responsive means including a diaphragm member having compressor generated pressure exposed to both sides so that said diaphragm member is normally balanced, said second pressure responsive means further including a resilient means connected to said diaphragm, said resilient means normally operative to urge said second pressure responsive means into contactive engagement with said first pressure responsive means to apply a force thereto which increases said controlled substantially constant ratio pressure drop, and governor means responsive to engine speed operative to reduce air pressure acting on one side of said diaphragm member creating a force differential thereacross opposing said resilient means thereby reducing said pressure ratio across said metering restriction.

3. A fuel control for a gas fired gas turbine engine as claimed in claim 2 including a temperature responsive metering valve operative with said metering restriction to vary the effective area thereof in response to temperature of gas fuel.

4. A fuel control as claimed in claim 2 wherein said resilient means is a spring member.

5. A fuel control for a gas fired gas turbine engine having an air compressor comprising: gas supply conduit means connected to said engine for supplying a pressurized gas fuel thereto, a metering restriction in said conduit means causing a gas fuel pressure drop, a regulator valve in said conduit means movable to control said gas fuel pressure drop across said metering restriction, first pressure responsive means responsive to gas pressure in said conduit means, said first pressure responsive means including a first movable rod member positionable in response to the forces acting on said first pressure responsive means and connected to said regulating valve to control its pressure drop regulating position in response to the forces acting on said first pressure responsive means, second pressure responsive means including a second movable rod and a spring member normally urging said second rod into contactive engagement with said first rod to transmit a force to assist in controlling said pressure drop, governor means connected to said second pressure responsive means operative to produce a force acting thereon with increasing engine speed that opposes the force produced by said spring member thereby urging said second movable rod out of engagement with said first rod.

6. A fuel control for a gas fired gas turbine engine having an air compressor comprising:
   gas supply conduit means connected to supply pressurized gas fuel to the engine from a gas source;
   a metering restriction in said conduit means causing a gas fuel pressure drop;
   a regulator valve in said conduit means movable to control said gas fuel pressure drop across said metering restriction;
   a first force transmitting member connected to said regulator valve for actuating the same;
   first pressure responsive means responsive to a compressor generated air pressure operatively connected to said first force transmitting member for actuating said regulator valve;
   second pressure responsive means responsive to the gas fuel pressure controlled by said regulator valve operatively connected to said first force transmitting member for actuating said regulator valve in opposition to said first pressure responsive means;
   third pressure responsive means responsive to said compressor generated air pressure and a pressure derived from said compressor generated air pressure for generating a force which varies in accordance with the pressure differential between said pressures;
   a second force transmitting member operatively connected to said third pressure responsive means and adapted to engage said first force transmitting member;
   spring means urging said second force transmitting member into engagement with said first force transmitting member thereby augmenting said first pressure responsive means;
   valve means operatively connected to control said derived compressor generated air pressure; and
   engine speed responsive means operatively connected to said valve means for actuating the same;
   said valve means being actuated in response to an increase in engine speed to cause a reduction in said derived compressor generator air pressure whereupon said spring means is overcome by said third pressure responsive means in response to the increasing pressure differential thereacross causing said second force transmitting member to move out of engagement with said first force transmitting member thereby removing said force augmenting said first pressure responsive means;
   said valve means being actuated in response to a decrease in engine speed to cause an increase in said derived compressor generated air pressure and a corresponding drop in the pressure differential across said third pressure responsive means permitting said spring means to actuate said second force transmitting member into engagement with said first force transmitting member thereby augmenting said first pressure responsive means.

7. A fuel control for a gas fired gas turbine engine having an air compressor comprising:

gas supply conduit means connected to supply pressurized gas fuel to the engine from a gas source;

a metering restriction in said conduit means causing a gas fuel pressure drop;

a regulator valve in said conduit means movable to control the gas fuel pressure in said conduit means upstream from said metering restriction and thus the fuel pressure drop across said metering restriction;

first resilient means operatively connected to said regulator valve for imposing a substantially constant force preload thereon tending to open said regulator valve;

a first chamber vented to said controlled gas pressure upstream from said metering restriction;

a second chamber vented to atmospheric air pressure;

a third chamber vented to a compressor generated air pressure;

a fourth chamber vented to atmospheric air pressure;

a fifth chamber vented to said compressor generated air pressure;

a sixth chamber vented to a said compressor generated air pressure;

a first pressure responsive member exposed to said first and second chambers and responsive to the pressure differential therebetween;

a second pressure responsive member exposed to said second and third chambers and responsive to the pressure differential therebetween;

a third pressure responsive member exposed to said third and fourth chambers and responsive to the pressure differential therebetween;

a fourth pressure responsive member exposed to said fourth and fifth chambers and responsive to the pressure differential therebetween;

a fifth pressure responsive member exposed to said fifth and sixth chambers and responsive to the pressure differential therebetween;

governor means including valve means operatively connected to said sixth chamber for controlling the compressor generated air pressure therein and thus the pressure differential across said fifth pressure responsive member;

compressor speed responsive means operatively connected to said governor valve means for actuating the same in response to compressor speed varying from a selected value;

second resilient means operatively connected to said fifth pressure responsive member for imposing a force thereagainst in opposition to the pressure differential across said fifth pressure responsive member;

first force transmitting means operatively connected to said first, second and third pressure responsive members and said regulator valve for actuating said valve in response to the forces imposed by said first, second and third pressure responsive members to thereby maintain a first substantially constant ratio of gas pressures across said metering restriction; and second force transmitting means operatively connected to said fourth and fifth pressure responsive members and urged into engagement with said first force transmitting means in response to said second resilient means to thereby augment the force tending to open said regulating valve;

said governor valve means being actuated in response to an overspeed condition of the compressor to cause an increase in the pressure differential across said fifth pressure responsive member which overcomes said second resilient means thereby urging said second force transmitting means out of engagement with said first force transmitting means to eliminate said augmenting force therefrom.

References Cited by the Examiner
UNITED STATES PATENTS

| | | | |
|---|---|---|---|
| 2,545,856 | 3/1951 | Orr | 60—39.28 |
| 2,668,414 | 2/1954 | Lee | 60—39.28 |
| 2,869,322 | 1/1959 | Rankin | 60—39.28 |
| 3,040,529 | 6/1962 | Hurtle | 60—39.28 |
| 3,167,082 | 1/1965 | Oliphant | 60—39.28 |
| 3,213,613 | 10/1965 | Schwent et al. | 60—39.28 |

JULIUS E. WEST, *Primary Examiner.*